United States Patent
Mei et al.

(10) Patent No.: US 9,210,248 B2
(45) Date of Patent: Dec. 8, 2015

(54) METHOD AND APPARATUS FOR DISPLAYING CONTACT INFORMATION BASED ON AN IMAGE EMBEDDED WITH CONTACT INFORMATION

(75) Inventors: Xinyan Mei, Nanjing (CN); Quan Ma, Nanjing (CN); Feng Fu, Nanjing (CN)

(73) Assignee: Samsung Electronics Co., Ltd (KR)

( * ) Notice: Subject to any disclaimer, the term of this patent is extended or adjusted under 35 U.S.C. 154(b) by 76 days.

(21) Appl. No.: 13/280,803

(22) Filed: Oct. 25, 2011

(65) Prior Publication Data
US 2012/0098861 A1   Apr. 26, 2012

(30) Foreign Application Priority Data
Oct. 12, 2011   (KR) .................. 10-2011-0104059

(51) Int. Cl.
*H04M 1/57* (2006.01)
(52) U.S. Cl.
CPC ...................................... *H04M 1/576* (2013.01)
(58) Field of Classification Search
CPC ........................... H04M 1/27455; H04M 1/576
See application file for complete search history.

(56) References Cited

U.S. PATENT DOCUMENTS

| | | | | |
|---|---|---|---|---|
| 7,738,912 B1 * | 6/2010 | Hawkins et al. | ........... | 455/550.1 |
| 8,331,924 B1 * | 12/2012 | Nolen | ........................... | 455/420 |
| 2006/0084478 A1 * | 4/2006 | Erlichmen | ...................... | 455/566 |
| 2008/0091723 A1 | 4/2008 | Zuckerberg et al. | | |
| 2009/0006484 A1 | 1/2009 | Wang | | |
| 2009/0023472 A1 * | 1/2009 | Yoo et al. | .................... | 455/556.1 |
| 2009/0037477 A1 * | 2/2009 | Choi et al. | ................. | 707/104.1 |
| 2010/0010963 A1 * | 1/2010 | Dinn | ................................. | 707/3 |
| 2010/0062753 A1 * | 3/2010 | Wen et al. | ..................... | 455/418 |
| 2010/0245241 A1 * | 9/2010 | Kim et al. | ...................... | 345/156 |
| 2011/0026778 A1 * | 2/2011 | Ye | ................................. | 382/118 |
| 2011/0256907 A1 * | 10/2011 | Lee et al. | ...................... | 455/566 |

FOREIGN PATENT DOCUMENTS

| | | |
|---|---|---|
| CN | 1620081 | 5/2005 |
| CN | 101843086 | 9/2010 |

OTHER PUBLICATIONS

Tangshan Juren, "Mystery of face reorganization", Picasa 3.5, Experience Note, Sep. 28, 2009.
Xiangbei, "Facebook Facial Recognition Test Pictures (Image)", Jul. 5, 2010.
Chinese Office Action dated Nov. 1, 2013 issued in counterpart Application No. 201010508163.2.

* cited by examiner

*Primary Examiner* — Kee M Tung
*Assistant Examiner* — Nicholas R Wilson
(74) *Attorney, Agent, or Firm* — The Farrell Law Firm, P.C.

(57) ABSTRACT

A method and an apparatus for displaying contact information using an image including the contact information. The method includes displaying an image; detecting when a preset region of the image is selected; and displaying the contact information corresponding to the preset region of the image, when the preset region is selected.

19 Claims, 8 Drawing Sheets

FIG. 2

| CONTACT INFORMATION KEYWORD | CONTACT NAME |
| --- | --- |
| | CONTACT PHONE NUMBER |
| | CONTACT E-MAIL |
| | .... |

FIG. 3

| FACE REGION KEYWORD | VERTEX INFORMATION OF FACE REGION |
| | WIDTH INFORMATION OF FACE REGION |
| | LENGTH INFORMATION OF FACE REGION |
| | .... |

METHOD AND APPARATUS FOR DISPLAYING CONTACT INFORMATION BASED ON AN IMAGE EMBEDDED WITH CONTACT INFORMATION

PRIORITY

This application claims priority under 35 U.S.C. §119(a) to Korean Patent Application No. 10-2011-0104059, which was filed in the Korean Intellectual Property Office on Oct. 12, 2011, the entire disclosure of which is incorporated herein by reference.

BACKGROUND OF THE INVENTION

1. Field of the Invention

The present invention relates to a method and an apparatus for displaying contact information based on an image embedded with the contact information.

2. Description of the Related Art

A typical communication device displays contact information, for example, names, phone numbers, e-mail addresses, and mailing addresses, to a user as a type of list. The user then searches for desired contact information displayed in the list. However, when the user uses the typical communication device, it can be confusing when the same name is displayed more than once in the contact list. Further, when the user forgets the contact name displayed in the contact list, the user cannot successfully contact the person.

Additionally, it is also common for a communication device to include a camera or at least photo viewer application. As such, images saved in a user device often include tags that identify the people in the images. However, these images do not include contact information and do not involve any relevance to contacting a person. Thus, the user of the communication device cannot search a corresponding contact manner or contact information based on the displayed image.

The contact image can be formed in a general image format, for example, as .bmp, .jpg, .png, .gif, .tga, and .tiff. When browsing the general image, the user cannot obtain the contact information corresponding to the image. That is, even when the user browses the image, the user cannot confirm the corresponding contact information because the corresponding image does not include the contact information.

In a conventional list-based contact information displaying method, the user cannot intuitively confirm the contact information corresponding to the contact image (for example, face or character image of a server or the other party). Accordingly, the user cannot communicate with the server or the other party using the contact image not including the contact information.

As a result, according to the conventional list-based contact information displaying method, since the contact image does not include the contact information and the user cannot intuitively see the contact information, the user cannot intuitively search for the contact information through the contact image and a separate manipulation is required to search for the contact information.

SUMMARY OF THE INVENTION

Accordingly, the present invention has been made to solve the above-mentioned problems occurring in the prior art, and to provide at least the advantages described below.

An aspect of the present invention is to provide a method and apparatus for storing contact information in an image including a contact.

Another aspect of the present invention is to provide a method and apparatus for displaying contact information in a displayed image including the contact information.

Another aspect of the present invention is to provide a method and apparatus for communicating with a contact using contact information displayed in an image including the contact information.

Additional aspects of the present general inventive concept will be set forth in part in the description which follows and, in part, will be obvious from the description, or may be learned by practice of the general inventive concept.

In accordance with an aspect of the present invention, various contact information and location information of a face region of an image are generated as an image including the contact information and stored to a communication device. By clicking one or more face regions of the image, a user can visually see the contact information and communicate using the contact information, to thus enhance user's convenience.

According to an aspect of the present general inventive concept, a method for displaying contact information is provided. The method includes displaying an image; detecting a selection of a preset region of the image; and displaying the contact information corresponding to the preset region of the image.

According to another aspect of the present invention, an apparatus for displaying contact information is provided. The apparatus includes a display unit for displaying an image; and a detection unit for detecting when a preset region of the image is selected. Contact information corresponding to the preset region of the image is displayed, when the preset region is selected.

According to another aspect of the present invention, an apparatus for generating an address book using an image including contact information is provided. The apparatus includes a generation unit for generating the image including contact information corresponding to a preset region included in the image, and location information of the preset region; and a forming unit for generating an address book using the generated image, wherein the image comprising the contact information comprises a first region for storing image data, a second region for storing the contact information corresponding to the image, and a third region for storing location information of a preset region.

BRIEF DESCRIPTION OF THE DRAWING FIGURES

The above and other aspects, features, and advantages of certain embodiments of the present invention will become apparent and more readily appreciated from the following description of the embodiments, taken in conjunction with the accompanying drawings, in which:

FIG. 2 illustrates a contact information data structure according to an embodiment of the present invention;

FIG. 3 illustrates a face region data structure according to an embodiment of the present invention;

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of certain embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
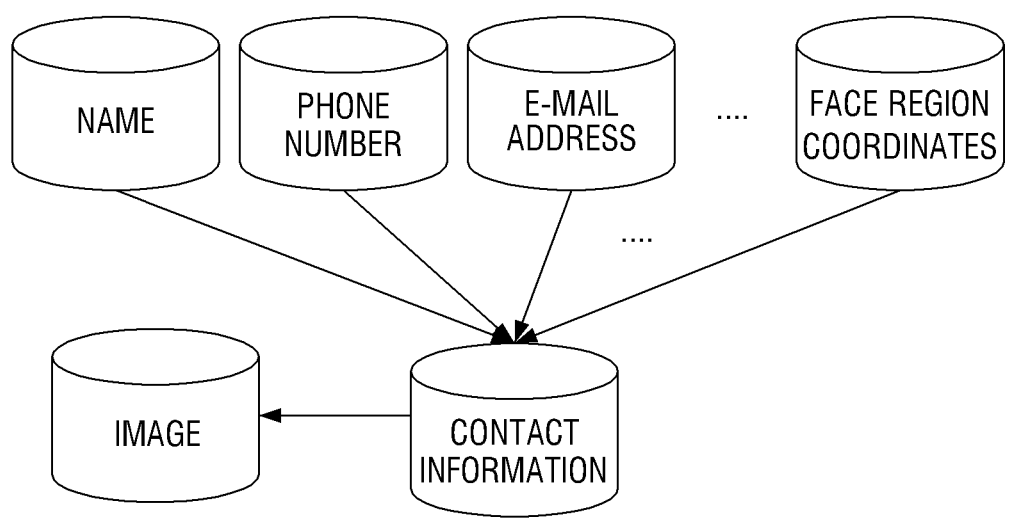
FIG. 1 is a diagram illustrating an image data structure including contact information according to an embodiment of the present invention.

FIG. 1 is a diagram illustrating an image data structure including contact information according to an embodiment of the present general inventive concept.

Referring to FIG. 1, an image includes image data, contact information, and location information of a face region. For example, the image includes the contact information and the location information of the face region, e.g., face region coordinates, in a storage area separate from an image data storage region. The contact information may include a contact name (for example, a user name and an ID), a phone number, an e-mail address, a mailing address, a birth date, etc. Herein, an attribute value of the face region relates to the location information of the face region of the image.

For example, when the face region is rectangular, the location information can include vertex location information (for example, coordinates of the upper left vertex), width information, and length information of the face region. When the face region is circular, the location information can include center location information and radius information of the face region. In implementation, the location information can include coordinates of every pixel included in the face region or coordinates of outline pixels surrounding the face region.

Figure 4:
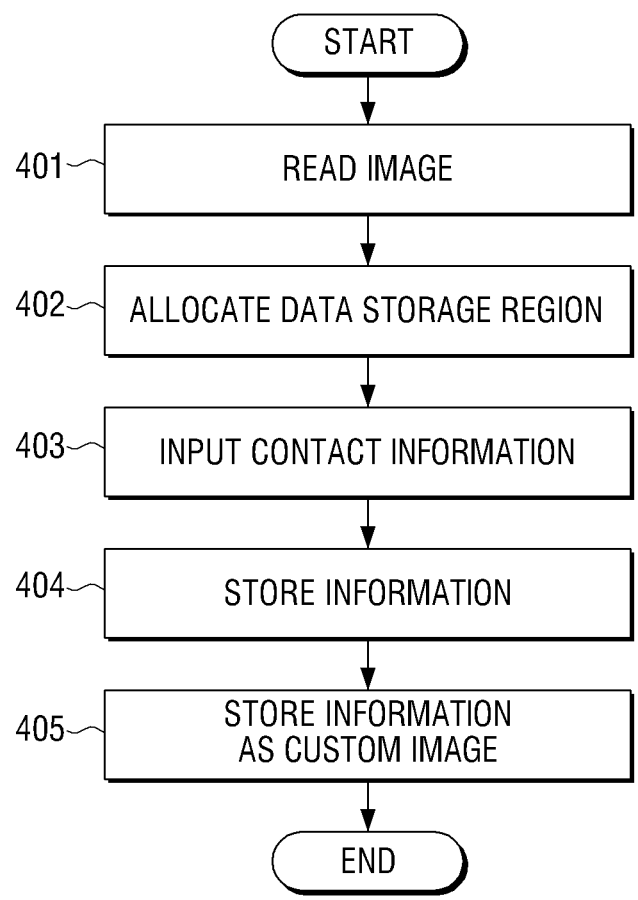
FIG. 4 is a flowchart illustrating a method for generating an image including contact information according to an embodiment of the present invention.

FIG. 2 illustrates a contact information data structure according to an embodiment of the present invention, FIG. 3 illustrates a face region data structure according to an embodiment of the present invention, and FIG. 4 is a flowchart illustrating a method for generating an image including contact information according to an embodiment of the present invention.

Referring to FIG. 4, the method for generating the image including the contact information includes reading the image (S401), allocating a data storage region (S402), inputting the contact information (S403), storing the information (S404), and storing the information as a custom image (S405), which are described respectively.

First in step S401, an image of a general format is read. For example, the general image format can include .bmp, .jpg, .png, .gif, .tga, and .tiff. The image can include one or more head images of different people, i.e., contacts. Each head image of a contact can be a face region.

More specifically, in step S401, face regions of the image are detected by reading the image and obtaining location information of the face regions. For example, face regions within the image can be obtained automatically using a facial recognition program or may done manually by a user identifying face regions within the image. Further, after a face region is identified, location information of the face region is obtained from pixels corresponding to the face region. As described above, the location information can include coordinates of every pixel included in the face region or coordinates of outline pixels surrounding the face region.

Besides the following explanation, the image can be read and analyzed variously according to the image format. The image data processing is not the core of the present general inventive concept, and the corresponding technique is well known to those skilled in the relevant art. Accordingly, its description shall be omitted without affecting the understanding of the present general inventive concept.

The face region of the image of the general format is read and the location coordinates of the corresponding face region are analyzed and stored as the location information of the face region as above.

The location information of the face region can be used to determine whether a preset region is selected when the user clicks the image, to be explained. More specifically, the coordinate information of the region (the click region) to be touched by the user is compared the location information of the face region of the corresponding image. When the coordinate data of the click a region belongs to the location coordinate data of the face region, the click region belongs to the range of the face region. Otherwise, the click region is out of the range of the face region.

Next, the data storage region for storing the image including the contact information is allocated (S402). The allocated data storage region can include three regions. The first region stores the read image data. The second region stores the contact information. The third region stores information relating to the face region.

Accordingly, the read image data can be stored in the first region of the allocated data region. The second region can be allocated according to the size of the read image and/or the number of the contacts of the image. The step S402 for allocating the data storage region can be performed manually or automatically by a specific program. In detail, the data storage region can be allocated in the default size suitable for the size of the read image. The storage region can be allocated automatically or manually based on the data size. Descriptions on the data storage region allocation shall be omitted for brevity.

In step S403, contact information is input for an identified face region. For example, the contact information can include a name, a phone number, an e-mail address, a birth date, a mailing address, etc. The contact information can be manually input by a user, and/or automatically input by reading existing contact information. For example, when a user enters a name, or a facial recognition recognizes a name associated with a face in the identified face region, a device may automatically retrieve previously stored contact information for the name.

Next, the contact information and the location information of the face region are stored (S404). In detail, the input contact information can be stored in the corresponding storage region (the second region of the storage region containing the corresponding image data) to match the corresponding image. When a plurality of images exists for one contact information, the corresponding contact information can be stored to each image.

When the face region is rectangular, the location information of the face region includes the vertex location information, the width information, and the length information of the face region as shown in FIG. 3.

By contrast, when the face region is circular, the location information includes the location information of the center point and the radius information of the face region. Besides, an algorithm that obtains the attribute value of the face region according to various face region shapes can be considered. Yet, various shapes can be easily modified and construed by those skilled in the art based on the basic rectangular and circular shapes and shall not be further explained.

The generated contact information can be stored in the allocated second region, and the location information of the face region can be stored in the third region.

The contact information format of the image can be set or changed according to requirements of the user.

The location information of the face region can be obtained using a face recognition module interface. In detail, a face recognition module engine starts. The image data is input to the face recognition module engine. The face recognition module can calculate the vertex location information, the width information, and the length information of the face regions in the image.

While the location information is calculated using the face recognition module interface, the location information may be calculated manually by the user. That is, the user may manually input the vertex location information, the width information, and the length information of the face region through an input unit.

The location information of the face region can also include priority indication information for indicating priority of the contact information. The priority indication information is used to select one of the contact information displayed in the screen when the image region selected by the user belongs to two or more face regions. That is, when the image region selected by the user belongs to two or more face regions, a display unit can display the contact information having the highest priority, based on the priority indication information.

For example, the priority indication information can be determined based on a frequency degree of the communication used by the user, i.e., how often the user communicates with a particular contact, or a lower or higher priority indication information value of the corresponding contact information can be input manually. Alternatively, the priority indication information can be set in a descending order or an ascending order of the contact information generation or setting. Further, the priority indication information may be determined by a user setting.

In step S404, the image data, the contact information, and the location information of the face region are stored in an image format including contact information.

The image data stored in the first region can include information that can be matched to the corresponding contact information and location information of the face region.

Of the storage region of the corresponding image, the first region stores the image data, the second region stores the contact information, and the third region stores the location information of the face region.

Accordingly, when a face region of an image including contact information is selected, the stored contact information is displayed on the screen. Substantially, the image is matched to the contact information and the location information of the face region.

One skilled in the corresponding art can apply the steps S401 through S405 to a method for generating an address book of a contact information displaying apparatus, or one or more images including the contact image generated in steps S401 through S405 can be used as the address book of the contact information displaying apparatus.

Accordingly, an address book can be recorded as an image list including contact information, rather than a conventional contact information list. That is, one or more image lists can form an address book.

An image including contact information may include the image data, the actual contact information, and the location information of the face region, or the image including contact information may include the image data and the location information of the face region, a corresponding face region of the location information is mapped to particular contact information stored separately.

Data reading and writing through a series of clicking operations on the face region of the image are well known as data (or file) writing and reading in the relevant art, and thus shall not be further explained.

Figure 5:
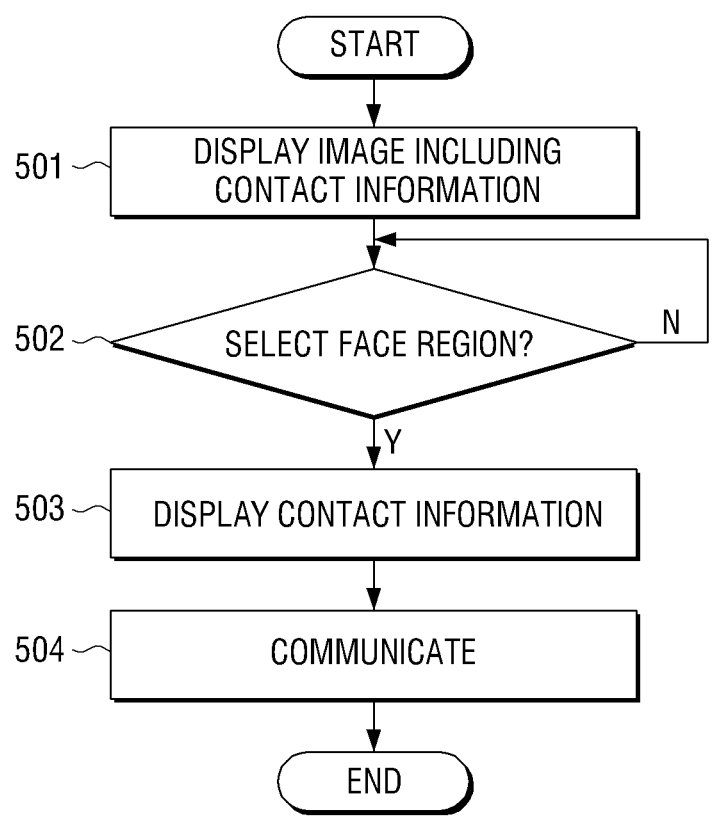
FIG. 5 is a flowchart illustrating a method for communicating based on an image including contact information according to an embodiment of the present invention.

FIG. 5 is a flowchart illustrating a method for displaying contact information based on an image including contact information according to an embodiment of the present invention.

Referring to FIG. 5, in step S501, an image including contact information is displayed. The image including the contact information can be displayed in the screen so that the user can click it. The image including the contact information is pre-generated and stored in the first region of the storage region, and can be displayed in the screen according to a read signal.

When a face region included in the displayed image is selected in S502, e.g., when a user clicks the image displayed in the screen through an input unit, the contact information is displayed in step S503.

For example, an algorithm for determining whether the region is the face region of the image can compare the location information of the region selected by the user and the location information of the face region of the corresponding image. More specifically, because the location information of the face region of the image is matched with the corresponding image, whether the user selected region is the face region can be determined by comparing the stored location information of the face region to the location information of the user's selection.

The contact information is displayed (S503). When the user selects the face region of the image, the contact information corresponding to the face region can be displayed. When the user selects some other region than the face region, there can be no response. Hence, the user can confirm the displayed contact information. In so doing, the user can edit the contact information of the image by modifying the displayed contact information.

In step S504, the user communicates based on the displayed contact information. For example, when a user selects a phone number of the displayed contact information, telephone communication can be performed, when the user selects an e-mail address of the contact information, an e-mail communication can be performed, etc. Accordingly, the displayed contact information includes information relating to a communication manner and a communication type. Based on the displayed contact information, the user communicates with the other party.

As described above, the location information of the face region can include priority indication information indicating the priority of the contact information. For example, when the face region is rectangular, the location information of the face region includes vertex location information, width information, and length information. When the priority indication information is added to this two-dimensional location information, the location information of the face region can be three-dimensional location information. That is, the three-dimensional location information includes three coordinates (x, y, z), where z denotes the priority indication information. The face region having the smallest z value can be the lowest layer, i.e., lowest priority, and the face region having the greatest z value can be the highest layer i.e., highest priority.

Therefore, when a plurality of face regions superimpose on an image, for example, when one image includes a plurality of face regions and the face regions overlap with each other, when the user clicks the overlapping area, the face region to be initially displayed on the screen is determined by the z coordinate element, i.e., is the contact information corresponding to the contact face region having the greatest z value. Thereafter, the user can scroll through each of the other contact information with lower z values using an input device.

According to another embodiment of the present invention, when the user clicks the overlapping area, two or more contact information may be manually selected by the user.

According to another embodiment of the present invention, the user may edit the contact information corresponding to the image displayed in the screen. When the user edits the contact information, the corresponding image can be updated based on the edited contact information.

As described above in conjunction with FIG. 5, contact information is displayed, which is matched to a corresponding face region of an image displayed on a display screen, when a user selects the corresponding face region of the image. Thus, the user can intuitively confirm the contact information of the corresponding face region and easily communicate based on the contact information.

The method for displaying the contact information based on the image including the contact information can be applied to a contact information displaying apparatus. The contact information displaying apparatus can be, for example, a cell phone, a tablet computer, a Personal Computer (PC), a Personal Digital Assistant (PDA), etc. The contact information displaying apparatus can include a display unit for displaying the contact information, a communication module for communicating with the outside based on the contact information, and a control unit for controlling the components, which shall be explained by referring to FIG. 6. The contact information displaying method can be applied to the control unit to control to display the contact information in the display unit and to communicate based on the displayed contact information.

Figure 6:
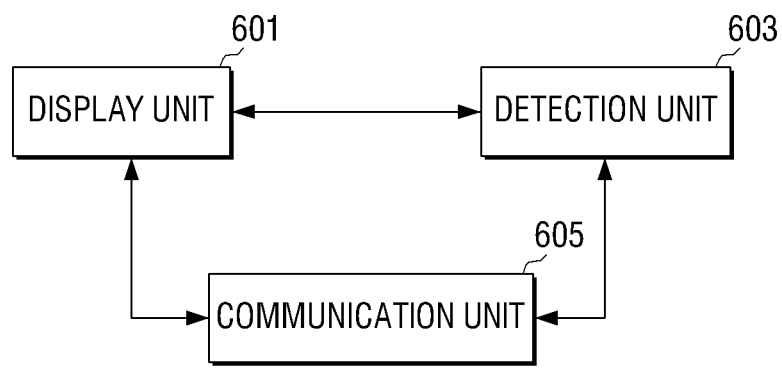
FIG. 6 is a block diagram illustrating an apparatus for communicating based on an image including contact information according to an embodiment of the present invention.

FIG. 6 is a block diagram illustrating a contact information displaying apparatus according to an embodiment of the present invention.

Referring to FIG. 6, the contact information displaying apparatus includes a display unit 601, a detection unit 603, and a control unit 605. The display unit 601 displays an image including contact information on a display screen. The display unit 601 can be implemented using various display devices such as a touch-screen Liquid Crystal Display (LCD), Light Emitting Diode (LED) display, or Cathode Ray Tube (CRT) display.

The detection unit 603 detects when a user clicks a face region included in the image displayed in the screen. Specifically, when the user clicks the face region of the image according to the detection result of the detection unit 603, the display unit 601 displays the contact information corresponding to the face region.

More specifically, when a selected part of the displayed image corresponds to a face region, according to the detection result of the detection unit 603, the display unit 601 displays contact information that is matched to the face region of the image. For example, the display unit 601 can display the contact information by superimposing the contact information on the face region included in the displayed image. Alternatively, the contact information may be displayed in a new screen window.

The communication unit 605 communicates based on the contact information displayed by the display unit 601, i.e., based on the particular contact information selected by a user from the contact information displayed by the display unit 601. The communication unit 605 can perform the corresponding communication based on the contact manner or the contact address of the type of contact information.

Figure 7:
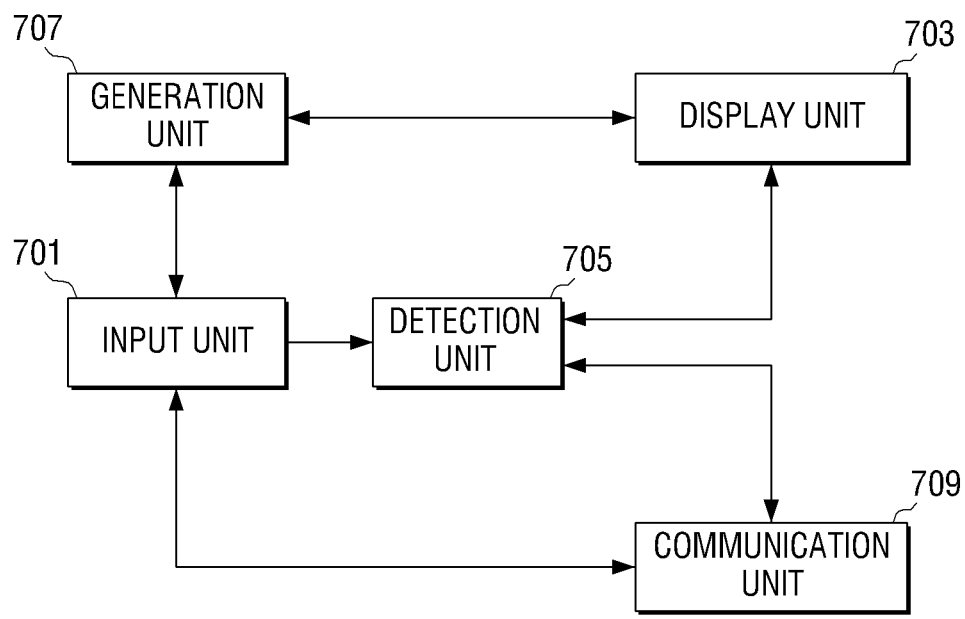
FIG. 7 is a block diagram of an apparatus for communicating based on an image including contact information according to an embodiment of the present invention.

FIG. 7 is a block diagram illustrating a contact information displaying apparatus according to an embodiment of the present invention.

Referring to FIG. 7, the displaying apparatus includes an input unit 701, a display unit 703, a detection unit 705, a generation unit 707, and a communication unit 709. The input unit 701 is used to receive input from a user. For example, using the input unit 701, the user provides information to the displaying apparatus or operates the displaying apparatus. The input unit 701 can be implemented using a touch screen, a keypad, a mouse, etc.

The display unit 703 displays the image including the contact information similar to the display unit 601 already described above.

The detection unit 705 detects when the selects a face region of the displayed image using the input unit 701. When the user selects a face region of the image, the detection unit 705 outputs the detection result to the display unit 703, so that the display unit 703 displays the contact information corresponding to the face region.

The generation unit 707 generates the image including the contact information. The generation unit 707 stores the image data, the contact information, and the location information of the face region of the image in the storage region. That is, the generation unit 707 stores the general image together with the contact information corresponding to the image and the location information of the face region, in the storage region. The generation unit 707 matches the corresponding image to the contact information and the location information of the face region.

The communication unit 709 communicates based on the displayed contact information, similar to the communication unit 605 already described above.

Figure 8:
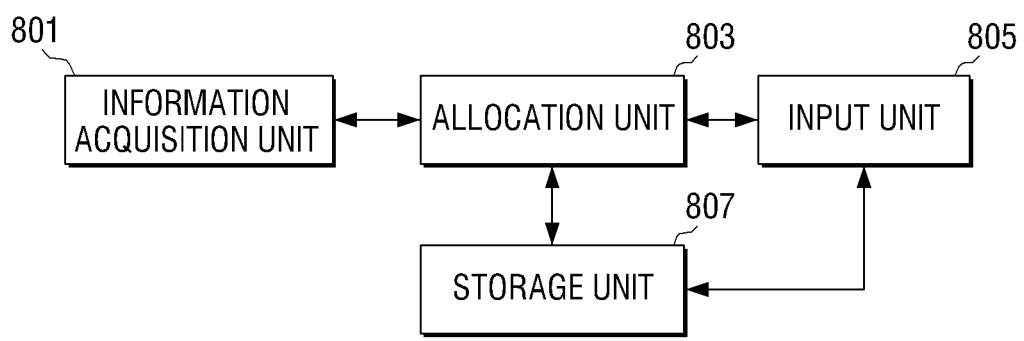
FIG. 8 is a block diagram of a generation unit according to an embodiment of the present invention.

FIG. 8 is a block diagram illustrating a generation unit of a contact information displaying apparatus according to an embodiment of the present invention.

Referring to FIG. 8, the generation unit includes an information acquisition unit 801, an allocation unit 803, an input unit 805, and a storage unit 807. The information acquisition unit 801 reads the image of a general format including at least one face region. The information acquisition unit 801 reads the image data by analyzing the image of the general format, and detects the location information of the face region. The information acquisition unit 801 analyzes the data information of the read image, and analyzes the location information of the face region.

The allocation unit 803 allocates a storage region for generating an image including contact information. For example, the information of the image including the contact information can be allocated as a first region for the image data, a second region for the contact information, and a third region for location information of the face area included in the image.

The input unit 805 receives the contact information and the location information of the face region of the image, or the corresponding information read from the storage.

The storage unit 807, e.g., a Random Access Memory (RAM), stores the contact information, the location information of the face region, and the image data to the corresponding regions of the storage region. The contact information and the location information of the face region stored to the storage unit 807 are mapped to the corresponding image. When the face region of the corresponding image is selected, the contact information corresponding to the image of the face region can be read.

According to other embodiments of the present general inventive concept, the apparatus can further include an edit unit (not shown) for editing the contact information corresponding to the image, and an update unit (not shown) for updating the corresponding image based on the contact information edited by the edit unit. Additionally, the allocation unit 803, the input unit 805, and the storage unit 807 can be used to update and edit the contact information, the location information of the face region, and the image data to the corresponding regions of the storage region.

Although many of the components of the apparatuses illustrated in FIGS. 6-8 are illustrated as separate units, many of these components may also be embodied as a single controller, for example, a processor, that performs the functions of the above-described units.

As described above, when a user wants to search for contact information, an apparatus for displaying contact information can display the contact information by clicking a face region on a displayed image. The contact information of the corresponding image can be intuitively confirmed and the intuitive contact information can be displayed.

In addition, because the interface corresponding to the contact information performs the function (the information communication) corresponding to selected contact information, the user can communicate easily by intuitively clicking the corresponding image.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for displaying contact information, the method comprising:
   displaying an image which includes an overlap area in which a first face region overlaps a second face region, the first face region being matched to first contact information and the second face region being matched to second contact information;
   detecting a user touch on the overlap area of the first face region and the second face region of the image; and
   automatically displaying only one of the first contact information and the second contact information having a highest usage from among the first contact information and the second contact information, in response to detecting the user touch on the overlap area.

2. The method of claim 1, wherein the image comprises a first region for storing image data, a second region for storing the first contact information and the second contact information corresponding to the image, and a third region for storing location information of the overlap area of the image.

3. The method of claim 1, wherein each of the first contact information and the second contact information includes at least one of a contact name, a phone number, an e-mail address, and a birth date.

4. The method of claim 1, further comprising:
   editing at least one of the first contact information and the second contact information; and
   updating the image based on the edited contact information.

5. The method of claim 1, further comprising:
   detecting a selection of the displayed contact information; and
   performing communication based on a communication type corresponding to the selected contact information.

6. A method for generating an address book using an image comprising contact information, the method comprising:
   generating an image comprising an overlap area of a plurality of face regions in which at least one face region overlaps a second face region, a first region for storing image data, a second region for storing a plurality of contact information that is respectively matched to each of the plurality of face regions, and a third region for storing location information of the overlap area; and
   generating an address book using the generated image,
   wherein the location information includes priority indication information of each of the plurality of contact information, and
   wherein the priority indication information is generated based on a number of uses of each of the plurality of contact information.

7. The method of claim 6, wherein generating the image comprises:
   obtaining the location information;
   inputting the contact information; and
   storing the image data, the plurality of contact information, and the location information in an allocated storage region.

8. The method of claim 6, further comprising:
   editing the plurality of contact information; and
   updating the image based on the edited contact information.

9. An apparatus for displaying contact information, the apparatus comprising:
   a display unit for displaying an image that includes an overlap area in which a first face region overlaps a second face region, the first face region being matched to first contact information and the second face region being matched to second contact information; and
   a detection unit for detecting a user touch on the overlap area of the first face region and the second face region of the image,
   wherein the display unit automatically displays only one of the first contact information and the second contact information having a highest usage from among the first contact information and the second contact information, in response to the detected user touch on the overlap area.

10. The apparatus of claim 9, wherein the image comprises a first region for storing image data, a second region for storing the first contact information and the second contact information corresponding to the image, and a third region for storing location information of the overlap area.

11. The apparatus of claim 9, wherein each of the first contact information and the second contact information comprises at least one of:
   a contact name;
   a phone number;
   an e-mail address; and
   a birth date.

12. The apparatus of claim 9, wherein the overlap area is identified using location information comprising vertex location information, width information, and length information of the overlap area.

13. The apparatus of claim 9, wherein the overlap area is identified using location information comprising center location information and radius information of the overlap area.

14. The apparatus of claim 9, wherein the first contact information and the second contact information each comprises a plurality of types of information.

15. The apparatus of claim 9, further comprising a controller for editing at least one of the first contact information and the second contact information, and updating the image based on the edited contact information.

16. The apparatus of claim 9, further comprising a communication unit which performs, when the displayed contact information is selected, communication based on a communication type corresponding to the selected contact information.

17. An apparatus for generating an address book using an image, the apparatus comprising:
- a generation unit for generating the image, which includes an overlap area of a plurality of face regions in which at least one face region overlaps a second face region, a first region for storing image data, a second region for storing a plurality of contact information that is respectively matched to each of the plurality of face regions, and a third region for storing location information of the overlap area; and
- a forming unit for generating an address book using the generated image,
- wherein the location information includes priority indication information of each of the plurality of contact information, and
- wherein the priority indication information is generated based on a number of uses of each of the plurality of contact information.

18. The apparatus of claim 17, wherein the generation unit comprises:
- an information acquisition unit for obtaining the location information;
- an input unit for receiving the plurality of contact information; and
- a storage unit for storing the image data, the plurality of contact information, and the location information of the overlap area in an allocated storage region.

19. The apparatus of claim 17, further comprising a controller for editing the plurality of contact information, and updating the image based on the edited contact information.

* * * * *